United States Patent
Guo

(10) Patent No.: US 9,684,668 B1
(45) Date of Patent: Jun. 20, 2017

(54) SYSTEMS AND METHODS FOR PERFORMING LOOKUPS ON DISTRIBUTED DEDUPLICATED DATA SYSTEMS

(75) Inventor: Fanglu Guo, Los Angeles, CA (US)

(73) Assignee: Veritas Technologies, Mountain View, CA (US)

( * ) Notice: Subject to any disclaimer, the term of this patent is extended or adjusted under 35 U.S.C. 154(b) by 1364 days.

(21) Appl. No.: 13/233,900

(22) Filed: Sep. 15, 2011

(51) Int. Cl.
*G06F 17/00* (2006.01)
*G06F 17/30* (2006.01)

(52) U.S. Cl.
CPC .. *G06F 17/30156* (2013.01); *G06F 17/30303* (2013.01)

(58) Field of Classification Search
CPC .................. G06F 17/03156; G06F 17/30303
See application file for complete search history.

(56) References Cited

U.S. PATENT DOCUMENTS

| | | | |
|---|---|---|---|
| 7,567,188 B1* | 7/2009 | Anglin et al. | .................. 341/63 |
| 2008/0205774 A1 | 8/2008 | Brinker et al. | |
| 2009/0210431 A1* | 8/2009 | Marinkovic | .......... G06F 17/302 |
| 2011/0099351 A1 | 4/2011 | Condict | |
| 2012/0158672 A1* | 6/2012 | Oltean et al. | ................. 707/692 |

OTHER PUBLICATIONS

Petros Efstathopoulos; Systems and Methods for Distributed Data Deduplication; U.S. Appl. No. 13/269,620, filed Oct. 9, 2011.
Cezary Dubnicki, et al.; HYDRAstor: a Scalable Secondary Storage; 7th USENIX Conference on File and Storage Technologies; USENIX Association.
Deepavali Bhagwat, et al.; Extreme Binning: Scalable, Parallel Deduplication for Chunk-based File Backup; HP Laboratories; IEEE MASCOTS; Sep. 21, 2009.
Petros Efstathopoulos; File Routing Middleware for Cloud Deduplication; Symantec Research Labs; Symantec Corporation; Culver City, US.
Wei Dong, et al; Tradeoffs in Scalable Data Routing for Deduplication Clusters; EMC.
Meyer, Dutch T., et al., "A Study of Practical Deduplication", FAST '11: 9th USENIX Conference on File and Storage Technologies, San Jose, CA, (Feb. 15-17, 2011).

* cited by examiner

*Primary Examiner* — Usmaan Saeed
*Assistant Examiner* — Paul Kim
(74) *Attorney, Agent, or Firm* — FisherBroyles LLP

(57) ABSTRACT

A computer-implemented method for performing lookups on distributed deduplicated data systems may include (1) identifying a collection of deduplicated data stored within a plurality of nodes, (2) identifying a request to locate a deduplicated object of the collection within the plurality of nodes, (3) identifying a fingerprint of the deduplicated object, the fingerprint being generated using an algorithm that maps deduplicated objects onto a fingerprint space, (4) directing the request, based on a partitioning scheme that divides the fingerprint space among the plurality of nodes, to a first node within the plurality of nodes that is responsible for forwarding requests pertaining to a partition of the fingerprint space that includes the fingerprint, and (5) forwarding the request from the first node to a second node identified by the first node as corresponding to the fingerprint. Various other methods, systems, and computer-readable media are also disclosed.

19 Claims, 6 Drawing Sheets

SYSTEMS AND METHODS FOR PERFORMING LOOKUPS ON DISTRIBUTED DEDUPLICATED DATA SYSTEMS

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

With the advent of cloud storage, some deduplicated data systems may need to scale to store very large collections of data and/or to serve many clients. Accordingly, deduplicated data may be stored across many nodes. In order to properly deduplicate data a deduplicated data system may need to frequently look up data segments (e.g., using fingerprints of the data segments) to see if they already exist in the system (and if so, where). However, maintaining a global list of fingerprints on a single node may degrade performance by creating a bottleneck and/or degrade reliability by providing a single point of failure. Alternatively, maintaining a global list of fingerprints on each node may degrade performance by requiring extensive cross-node communication for each update to the list as well as creating a potentially unwieldy data structure to store on each node. Accordingly, the instant disclosure identifies a need for additional, improved, and more scalable systems and methods for performing lookups on distributed deduplicated data systems.

SUMMARY

As will be described in greater detail below, the instant disclosure generally relates to systems and methods for performing lookups on distributed deduplicated data systems by performing lookups in two stages: first, looking up a fingerprint on a node responsible for matching any fingerprints in a range of fingerprints (e.g., that includes the fingerprint) to corresponding nodes, and, second, looking up the fingerprint on a node identified in the first lookup. In some examples, these systems and methods may direct subsequent lookups from a client to the identified node (e.g., until a lookup fails). In one example, a computer-implemented method for performing lookups on distributed deduplicated data systems may include (1) identifying a collection of deduplicated data stored within a plurality of nodes, (2) identifying a request to locate a deduplicated object of the collection within the plurality of nodes, (3) identifying a fingerprint of the deduplicated object that is generated using an algorithm that maps deduplicated objects onto a fingerprint space, (4) directing the request, based on a partitioning scheme that divides the fingerprint space among the plurality of nodes, to a first node within the plurality of nodes that is responsible for forwarding requests pertaining to a partition of the fingerprint space that includes the fingerprint, and (5) forwarding the request from the first node to a second node identified by the first node as corresponding to the fingerprint.

In some examples, the collection of deduplicated data may originate from a plurality of clients. In these examples, the request may come from a client within the plurality of clients, and at least one home node within the plurality of nodes may be designated for storing unique objects added to the collection of deduplicated data from the client.

The computer-implemented method may also include any of a variety of additional steps. For example, the computer-implemented method may include, in response to the request, identifying the deduplicated object on the second node. In some examples, the computer-implemented method may additionally include (1) identifying a subsequent request to locate an additional deduplicated object of the collection within the plurality of nodes and (2) forwarding the subsequent request directly to the second node based on having identified the deduplicated object on the second node.

In one embodiment, the computer implemented method may include (1) in response to the request, determining that the deduplicated object does not exist on the second node, (2) identifying a subsequent request to locate an additional deduplicated object of the collection within the plurality of nodes, (3) identifying an additional fingerprint of the additional deduplicated object that is generated using the algorithm that maps deduplicated objects onto the fingerprint space, and (4) based on determining that the deduplicated object does not exist on the second node, (i) directing the additional request, based on the partitioning scheme, to a third node within the plurality of nodes that is responsible for forwarding requests pertaining to an additional partition of the fingerprint space that includes the additional fingerprint, and (ii) forwarding the additional request from the third node to a fourth node identified by the third node as corresponding to the additional fingerprint.

In some embodiments, the computer-implemented method may also include (1) adding a deduplicated object to the collection of deduplicated data, (2) updating a fingerprint index on the second node with an association of the fingerprint with the deduplicated object, and (3) updating an additional fingerprint index on the first node with an association of the fingerprint with the second node.

In some examples, the computer-implemented method may also include (1) identifying a new node added to the plurality of nodes and (2) updating the partitioning scheme to reassign at least one partition of the fingerprint space to the new node.

In one embodiment, a system for implementing the above-described method may include an identification module programmed to (1) identify a collection of deduplicated data stored within a plurality of nodes, (2) identify a request to locate a deduplicated object of the collection within the plurality of nodes, and (3) identify a fingerprint of the deduplicated object that is generated using an algorithm that maps deduplicated objects onto a fingerprint space. The system may also include a direction module programmed to direct the request, based on a partitioning scheme that divides the fingerprint space among the plurality of nodes to a first node within the plurality of nodes that is responsible for forwarding requests pertaining to a partition of the fingerprint space that includes the fingerprint. The system may additionally include a forwarding module programmed to forward the request from the first node to a second node identified by the first node as corresponding to the fingerprint. The system may further include at least one processor configured to execute the identification module, the direction module, and the forwarding module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a collection of deduplicated data stored within a plurality of nodes, (2) identify a request to locate a deduplicated object of the collection within the plurality of nodes, (3) identify a fingerprint of the deduplicated object that is generated using an algorithm that maps deduplicated objects onto a fingerprint space, (4) direct the request, based on a partitioning scheme that divides the fingerprint space among the plurality of nodes, to a first node within the plurality of nodes that is responsible for forwarding requests pertaining to a partition of the fingerprint space that includes the fingerprint, and (5) forward the request from the first node to a second node identified by the first node as corresponding to the fingerprint.

As will be explained in greater detail below, by performing lookups in two stages, the systems and methods described herein may distribute the burden of lookups across a cluster of nodes without requiring each node to have a full view of all fingerprints, thereby potentially increasing the speed, reliability, and/or scalability of a cluster-hosted deduplicated data system. Furthermore, according to some examples, by arranging data in the deduplicated data system such that any given client may tend to require many lookups from a single node, the systems and methods described herein may increase the speed and/or reliability of the deduplicated data system by performing subsequent lookups directly on a node at the second stage without returning to the first-stage lookup until necessary.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
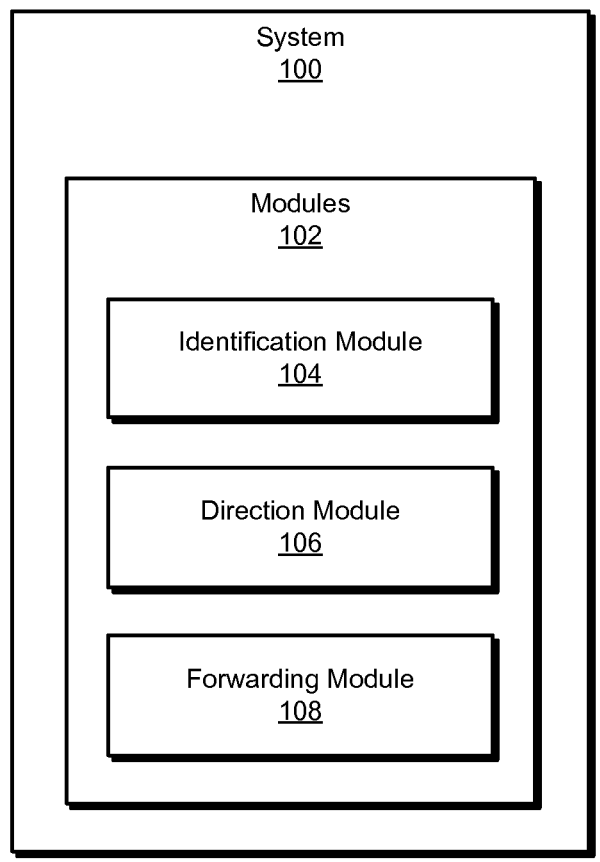
FIG. 1 is a block diagram of an exemplary system for performing lookups on distributed deduplicated data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
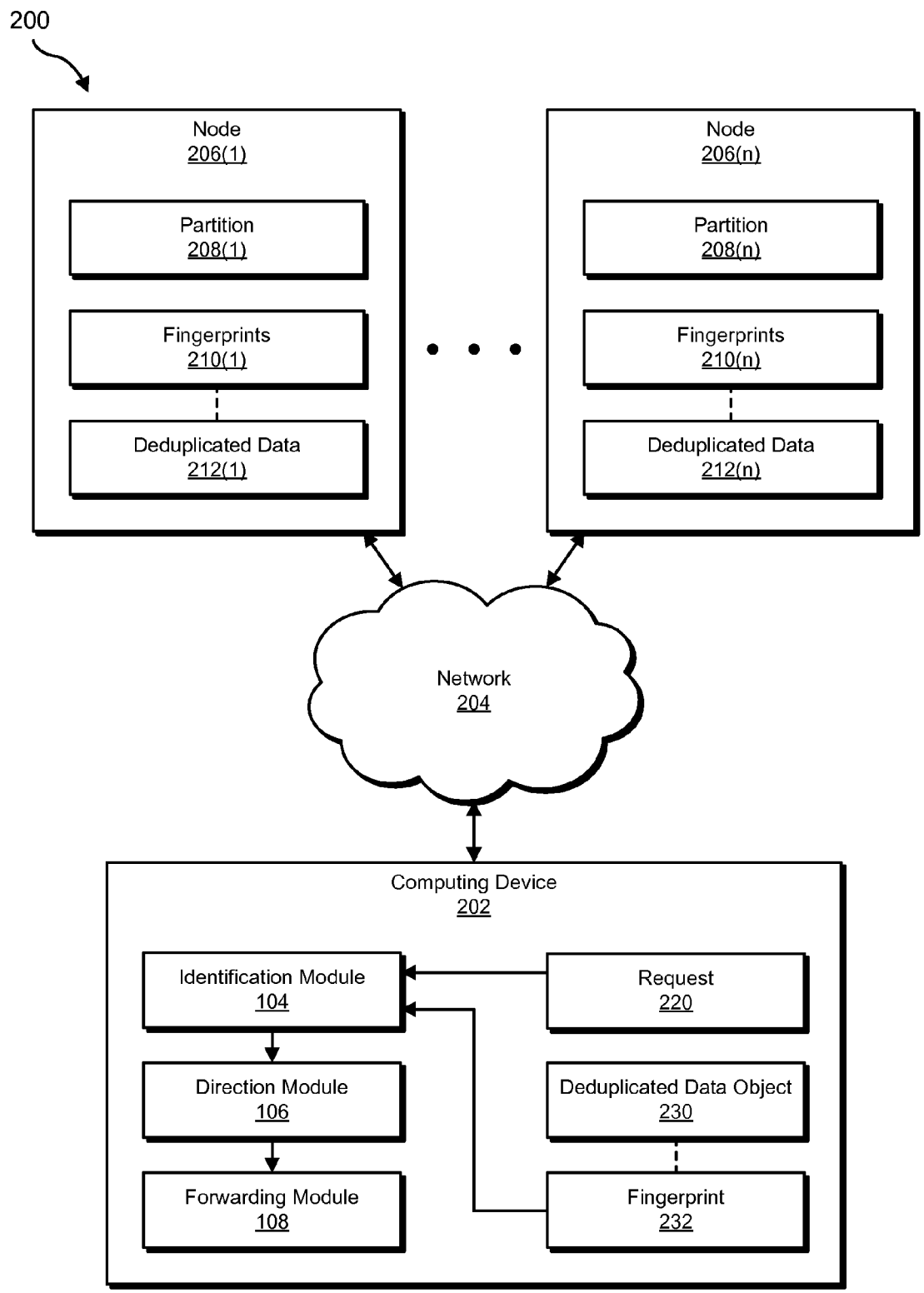
FIG. 2 is a block diagram of an exemplary system for performing lookups on distributed deduplicated data systems.
Figure 3:
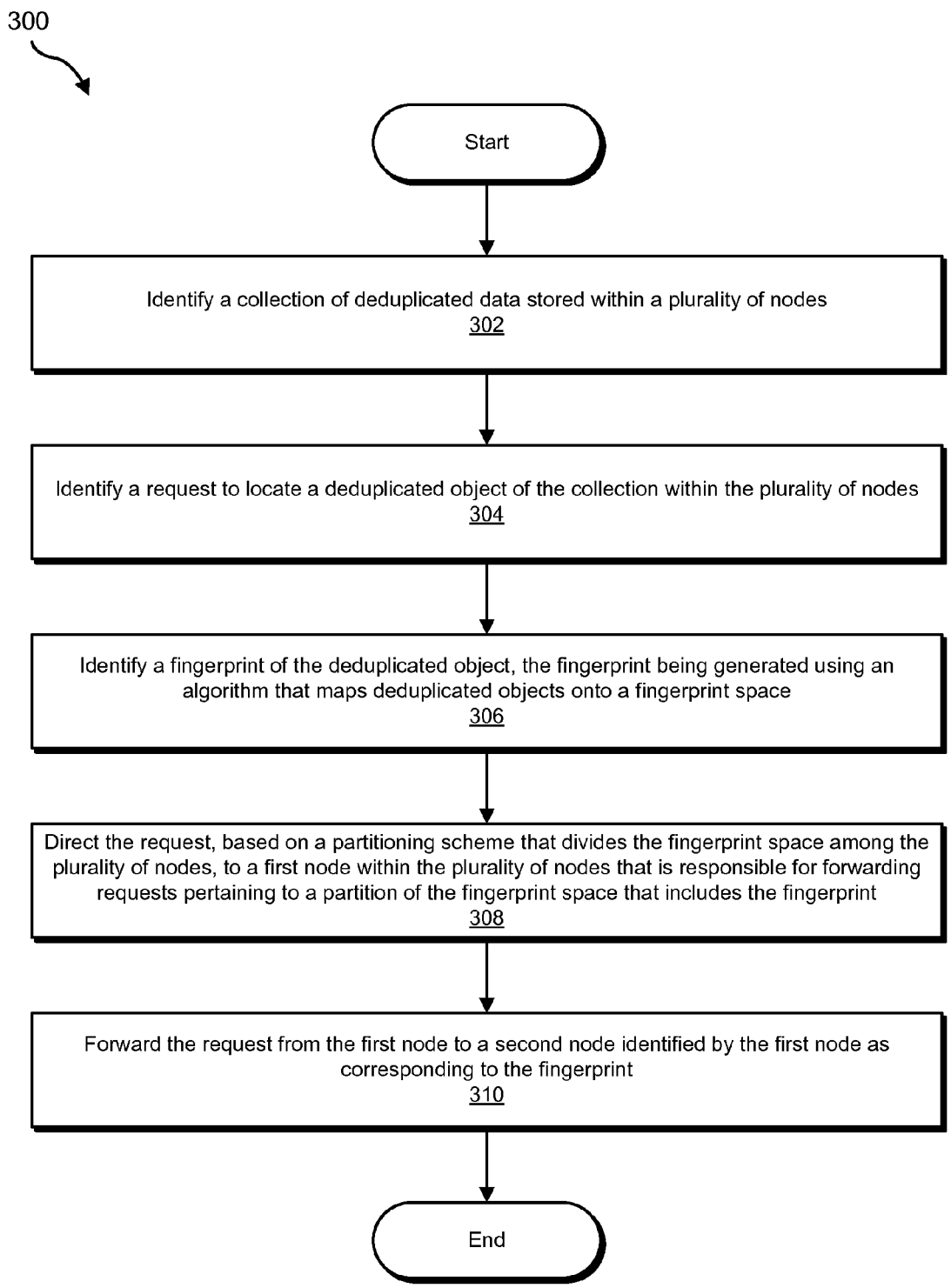
FIG. 3 is a flow diagram of an exemplary method for performing lookups on distributed deduplicated data systems.
Figure 4:
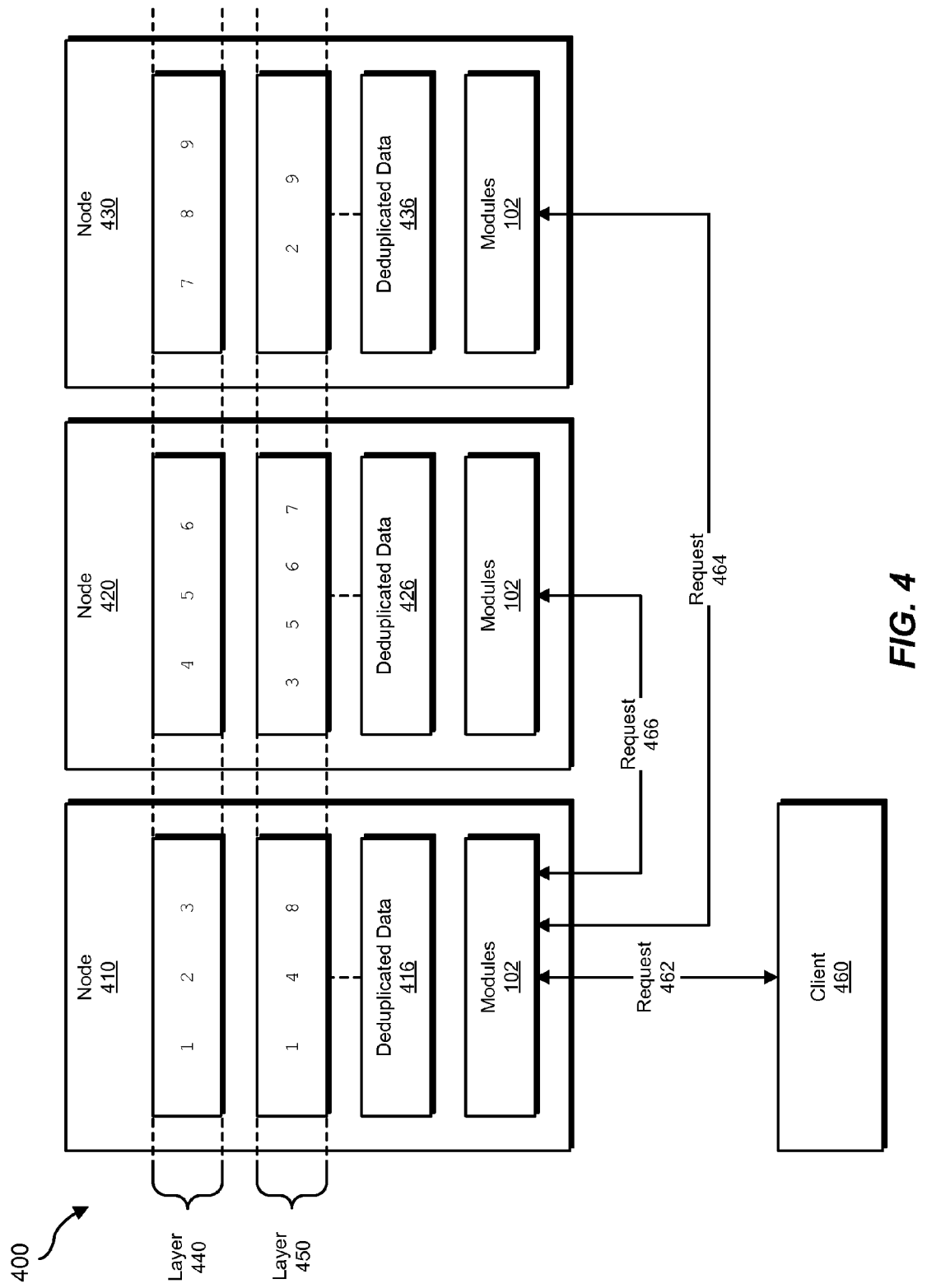
FIG. 4 is a block diagram of an exemplary system for performing lookups on distributed deduplicated data systems.

The following will provide, with reference to FIGS. 1, 2, and 4, detailed descriptions of exemplary systems for performing lookups on distributed deduplicated data systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing lookups on distributed deduplicated data systems. As illustrated in this figure, exemplary system 100 may include one or more modules 102 for performing one or more tasks. For example, and as will be explained in greater detail below, exemplary system 100 may include an identification module 104 programmed to (1) identify a collection of deduplicated data stored within a plurality of nodes, (2) identify a request to locate a deduplicated object of the collection within the plurality of nodes, and (3) identify a fingerprint of the deduplicated object that is generated using an algorithm that maps deduplicated objects onto a fingerprint space. Exemplary system 100 may also include a direction module 106 programmed to direct the request, based on a partitioning scheme that divides the fingerprint space among the plurality of nodes, to a first node within the plurality of nodes that is responsible for forwarding requests pertaining to a partition of the fingerprint space that includes the fingerprint.

In addition, and as will be described in greater detail below, exemplary system 100 may include a forwarding module 108 programmed to forward the request from the first node to a second node identified by the first node as corresponding to the fingerprint. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or nodes 206(1)-(*n*)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with nodes 206(1)-(*n*) (e.g., representing a distributed deduplicated data system) via a network 204.

In one embodiment, one or more of modules 102 from FIG. 1 may, when executed by at least one processor of computing device 202, facilitate computing device 202 in performing lookups on distributed deduplicated data systems. For example, and as will be described in greater detail below, one or more of modules 102 may cause computing device 202 to (1) identify a collection of deduplicated data 212 stored within nodes 206(1)-(n), (2) identify a request 220 to locate a deduplicated data object 230 within the nodes 206(1)-(n), (3) identify a fingerprint 232 of deduplicated data object 230 that is generated using an algorithm that maps deduplicated objects onto a fingerprint space, (4) direct request 220, based on a partitioning scheme that divides the fingerprint space among nodes 206(1)-(n) as partitions 208(1)-(n), to a first node within nodes 206(1)-(n) (e.g., node 206(1)) that is responsible for forwarding requests pertaining to a partition of the fingerprint space that includes fingerprint 232 (e.g., partition 208(1)), (5) forward request 220 from node 206(1) to a second node (e.g., node 206(n)) identified by node 206(1) as corresponding to fingerprint 232.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Nodes 206(1)-(n) generally represent any type or form of computing device that is capable of storing and/or handling requests for deduplicated data. Examples of nodes 206(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and nodes 206(1)-(n).

FIG. 3 is a flow diagram of an exemplary computer-implemented method 300 for performing lookups on distributed deduplicated data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a collection of deduplicated data stored within a plurality of nodes. For example, at step 302 identification module 104 may, as part of computing device 202 in FIG. 2, identify deduplicated data 212 stored within nodes 206(1)-(n).

As used herein, the phrase "deduplicated data" generally refers to data stored by storage systems that reduce redundant data by only storing a single instance of data (e.g., a data segment, a file, etc.), potentially referencing each data instance multiple times. In some examples, identification module 104 may identify a collection of deduplicated data originating from a plurality of clients. For example, the plurality of nodes may operate as a part of a cloud storage service configured to store data owned by different entities and submitted by corresponding client systems. In these examples, the cloud storage service may globally deduplicate data (e.g., deduplicate data across clients). As used herein, the term "node" may include any networked device capable of executing one or more of the modules described herein and/or storing deduplicated data. In some examples, the term "node" may refer to a group of computing devices configured to operate as a unit within a wider context of other nodes.

Identification module 104 may identify the collection of deduplicated data in any suitable manner. In some examples, identification module 104 may identify the collection of deduplicated data by reading a configuration file and/or receiving a message identifying one or more nodes within the plurality of nodes. Additionally or alternatively, identification module 104 may identify the collection of deduplicated data by executing on a node within the plurality of nodes.

FIG. 4 is an illustration of an exemplary system 400 for performing lookups on distributed deduplicated data systems. As shown in FIG. 4, exemplary system 400 may include a node 410, a node 420, and a node 430. Using FIG. 4 as an example, at step 302 identification module 104 may, as a part of modules 102 on node 410, identify a collection of deduplicated data (e.g., deduplicated 416, 426, and 436) stored within nodes 410, 420, and 430.

Returning to FIG. 3, at step 304 one or more of the systems described herein may identify a request to locate a deduplicated object of the collection within the plurality of nodes. For example, at step 304 identification module 104 may, as part of computing device 202 in FIG. 2, identify request 220 to locate deduplicated data object 230 within the nodes 206(1)-(n). Using FIG. 4 as an additional example, at step 304 identification module 104 may, as part of node 410, identify a request 462 from a client 460 to locate the deduplicated object within one of the nodes 410, 420, and 430 (e.g., within deduplicated data 416, 426, or 436).

As used herein, the phrase "deduplicated object" may refer to any unit of deduplicated data. For example, the phrase "deduplicated object" may refer to a block, a file, and/or any other unit of data that may be deduplicated.

As mentioned earlier, in some examples the collection of deduplicated data may originate from a plurality of clients. For example, the plurality of clients may use a cloud storage service that hosts the collection of deduplicated data for data storage. Accordingly, the request identified by identification module 104 may come from a client within the plurality of clients. In this example, at least one home node within the plurality of nodes may be designated for storing unique objects added to the collection of deduplicated data from the client. For example, when the client submits data blocks for storage to a deduplicated data system that stores data on the plurality of nodes, the deduplicated data system may store any unique blocks submitted by the client on a single node (or a group of nodes). In this manner, the data stored by the client may be concentrated at the "home node." As will be explained in greater detail below, this may result in improved lookup efficiency for the client and/or containment of the effects of failure for the node.

Identification module 104 may identify the request in any suitable context. For example, identification module 104 may operate as a part of a client handler on one or more of the nodes within the plurality of nodes. Accordingly, identification module 104 may identify the request by receiving the request, at a node within the plurality of nodes, from a client system. In some examples, identification module 104 may identify the request as a part of a client system sending the request. As will be explained in greater detail below, in these examples identification module 104 may identify the request in order to route the request to the correct node as part of an initial lookup stage.

Returning to FIG. 3, at step 306 one or more of the systems described herein may identify a fingerprint of the deduplicated object that is generated using an algorithm that maps deduplicated objects onto a fingerprint space. For example, at step 306 identification module 104 may, as part of computing device 202 in FIG. 2, identify a fingerprint 232 of deduplicated data object 230. In this example, fingerprint 232 may be generated using an algorithm that maps deduplicated objects onto a fingerprint space.

As used herein, the term "fingerprint" may refer to any type of fingerprint, hash function output, checksum, and/or digital signature that corresponds to and/or uniquely identifies a data object and any copies of the data object. In some examples, a fingerprint may be smaller than the data object that it identifies.

As used herein, the phrase "fingerprint space" may refer to the range of possible fingerprint values. For example, if the function generating fingerprints were "N modulo 256," the fingerprint space may consist of the range of integers from 0 to 255.

Identification module 104 may identify the fingerprint in any of a variety of ways. For example, identification module 104 may identify the fingerprint within the request. In some examples, identification module 104 may identify the fingerprint by generating the fingerprint with the algorithm (e.g., having received and/or identified the deduplicated object).

Returning to FIG. 3, at step 308 one or more of the systems described herein may direct the request, based on a partitioning scheme that divides the fingerprint space among the plurality of nodes, to a first node within the plurality of nodes that is responsible for forwarding requests pertaining to a partition of the fingerprint space that includes the fingerprint. For example, at step 308 direction module 106 may, as part of computing device 202 in FIG. 2, direct request 220, based on a partitioning scheme that divides the fingerprint space among nodes 206(1)-(n) as partitions 208(1)-(n), to a first node within nodes 206(1)-(n) (e.g., node 206(1)) that is responsible for forwarding requests pertaining to a partition of the fingerprint space that includes fingerprint 232 (e.g., partition 208(1)).

The partitioning scheme may divide the fingerprint space according to any of a variety of methods and/or criteria. For example, the partitioning scheme may divide the fingerprint space into ranges. In this example, if the fingerprint space consists of N possible fingerprints, the partitioning scheme may divide the fingerprint space into m partitions. The first partition may then cover the first N/m possible fingerprints, the second partition may cover the next N/m possible fingerprints, and so on. For example, the fingerprint space may consist of 256 possible fingerprints (e.g., represented by the numbers from 0 to 255), and the partitioning scheme may divide the fingerprint space into four partitions: 0 through 63, 64 through 127, 128 through 191, and 192 through 255.

In another example, the partitioning scheme may divide the fingerprint space by the result of a modulo operation on each possible fingerprint. In this example, if the fingerprint space consists of N possible fingerprints, the partitioning scheme may divide the fingerprint space into m partitions. The first partition may cover all fingerprints such that the value of the fingerprint modulo m is zero, the second partition may cover all fingerprints such that the value of the fingerprint modulo m is one, and so forth. For example, the fingerprint space may consist of 256 possible fingerprints, and the partitioning scheme may divide the fingerprint space into four partitions: (0, 4, 8, . . . ), (1, 5, 9, . . . ), (2, 6, 10, . . . ), and (3, 7, 11, . . . ).

Generally, the partitioning scheme may use any deterministic formula, algorithm, and/or data structure that divides the fingerprint space without requiring knowledge of what deduplicated data objects are actually stored in the plurality of nodes. In some examples, the partitions generated from the partitioning scheme may be assigned to the various nodes in the plurality of nodes (e.g., using a lookup table and/or similar data structure, a formula that maps partition numbers onto node numbers, etc.). In some examples, the partitions may be assigned evenly (or as evenly as possible) among the nodes. Additionally or alternatively, some nodes may be weighted (e.g., due to the expected load on the node, the capacity of the node, and/or the priority of the node) to a larger or smaller number of assigned partitions.

In some examples, a client system programmed to store deduplicated data in and/or retrieve deduplicated data from the plurality of nodes may include one or more modules and/or data structures used to identify the partitions of the partitioning scheme and/or map fingerprints to corresponding partitions within the partitioning scheme. Additionally or alternatively, one or more nodes within the plurality of nodes (and/or auxiliary devices configured to provide services for the plurality of nodes) may include such modules and/or data structures.

Directing module 106 may direct the request to the first node in any of a variety of contexts. For example, directing module 106 may, as a part of a node within the plurality of nodes and/or a deduplication server in a local network with the plurality of nodes, identify the first node as corresponding to a partition of the fingerprint space that includes the fingerprint. Directing module 106 may then direct the request to the first node. In some examples, directing module 106 may, as a part of a client system, identify the first node as corresponding to a partition of the fingerprint space that includes the fingerprint. Directing module 106 may then direct the request (e.g., in the same format and/or in a new format) to the first node. In another example, directing module 106 may, as a part of a node within the plurality of nodes, identify the first node as corresponding to a partition of the fingerprint space that includes the fingerprint. In this example, directing module 106 may then direct the request to the first node by sending the request directly to the first node. Additionally or alternatively, directing module 106 may then direct the request to the first node by responding to the requesting client system with the identity of the first node. The client system may then send the request to the first node. In this example, directing module 106 may accordingly have directed the request to the first node via a message to the client system.

Using FIG. 4 as an example, exemplary system 400 may include a layer 440 and a layer 450 across nodes 410, 420, and 430. Layer 440 may include data associating fingerprints with nodes in which deduplicated data objects corresponding to fingerprints are expected to be found. For example, the fingerprint space of exemplary system 400 may include fingerprints "1" through "9." Layer 450 may include data associating fingerprints corresponding with deduplicated data objects stored in the respective nodes. For example, client 460 may attempt to store a data object on a deduplicated data system using nodes 410, 420, and 430. Client 460 may therefore generate the fingerprint of the data object and determine that the fingerprint is "7." Client 460 may then send request 462 (e.g., representing a request to locate the data object) identifying fingerprint "7" to node 410. Direction module 106 (e.g., as a part of modules 102) on node 410 may then determine that the fingerprint "7" corresponds to a partition of the fingerprint space including fingerprints "7" through "9" and that the partition corresponds to layer 440 on node 430. Accordingly, node 410 may send a request 464 (e.g., representing the request to locate the data object) identifying fingerprint "7" to node 430. As will be explained in greater detail below, one or more of modules 102 on node 430 may then forward the request based on an association of fingerprint "7" with another node as stored in layer 440 of node 430.

In some examples, instead of client 460 sending a request to node 410 to locate node 430, direction module 106 may, as a part of client 460, identify node 430 as the node including the partition of the fingerprint space that includes the fingerprint "7." In this example, direction module 106 may send a request directly from client 460 to node 430 (e.g., instead of using node 410 as an intermediary). In other examples, node 410 may respond to client 460 directly with the identity of node 430 so that direction module 106 may, as a part of client 460, direct the request to node 430.

Returning to FIG. 3, at step 310 one or more of the systems described herein may forward the request from the first node to a second node identified by the first node as corresponding to the fingerprint. For example, at step 310 forwarding module 108 may, as part of computing device 202 in FIG. 2, forward request 220 from node 206(1) to a second node (e.g., node 206(n)) identified by node 206(1) as corresponding to fingerprint 232.

Forwarding module 108 may forward the request to the second node in any of a variety of contexts. For example, forwarding module 108 may forward the request by sending the request (e.g., in its original form or in a different form) directly to the second node. In another example, forwarding module 108 may forward the request by sending a message to a client system (e.g., that originally requested a lookup of the fingerprint) identifying the second node, in response to which the client system may send the request to the second node. Additionally or alternatively, forwarding module 108 may forward the request by sending a response identifying the second node to another node that had directed the request to the first node.

Using FIG. 4 as an example, node 430 may have received request 464 to look up fingerprint "7." Forwarding module 108, as part of node 430, may then check layer 440 of node 430 for the location of fingerprint "7." Layer 440 of node 430 may represent that fingerprint "7" is associated with node 420 (e.g., the deduplicated object with fingerprint "7" is expected to be stored on node 420). Accordingly, forwarding module 108 may, as a part of node 430, respond to request 464 by identifying node 420 as the probable location of the deduplicated object. Node 410 may then send a request 466 (e.g., representing the request to find the deduplicated object) to node 420. As shown in FIG. 4, layer 450 of node 420 may represent that a data object with fingerprint "7" is stored in deduplicated data 426.

In some examples, forwarding module 108 may, as a part of node 430, forward the request directly to node 420 instead of responding to node 410. Additionally or alternatively, forwarding module 108 may, as a part of node 430, send a message to client 460 identifying node 420 as the location of the data object corresponding to fingerprint "7." In this example, client 460 may respond to the message by sending the request to look up fingerprint "7" to node 420. After step 310, method 300 may terminate.

In some examples, the systems and methods described herein may, in response to the request, identify the deduplicated object on the second node. For example, these systems and methods may look up the deduplicated object on the second node by locating the fingerprint in a key/value table or analogous data structure. In some examples, these systems and methods may then respond to a client system that originated the request with a reference to the deduplicated object on the second node (so that, e.g., the client system may use the reference to represent the deduplicated object in a file system supporting deduplication). Additionally or alternatively, these systems and methods may then update a representation of storage corresponding to the client system with a reference to the deduplicated object on the second node.

In some examples, after identifying the deduplicated object on the second node, the systems and methods described herein may identify a subsequent request to locate an additional deduplicated object of the collection within the plurality of nodes. In these examples, these systems and methods may then forward the subsequent request directly to the second node based on having identified the deduplicated object on the second node. As mentioned earlier, in some examples data that corresponds to a client (e.g., unique data objects contributed by the client) may be stored on the same node (e.g., a "home node" for the client). In these examples, by referring subsequent lookup attempts to the second node instead of performing the first stage of lookup at a node with a partition corresponding to the fingerprint, these systems and methods may save time and resources (e.g., because the likelihood of a successful lookup may be high given the concentration of relevant data at the home node). Using FIG. 4 as an example, after identifying requested fingerprint "7" in layer 450 on node 420, the systems and methods described herein may send subsequent requests from client 460 directly to node 420 (e.g., until a lookup on node 420 fails).

In some examples, after identifying the deduplicated object on the second node, the systems and methods described herein may (1) identify a subsequent request to locate an additional deduplicated object of the collection within the plurality of nodes and (2) identify an additional fingerprint of the additional deduplicated object, the additional fingerprint being generated using the algorithm that maps deduplicated objects onto the fingerprint space. These systems and methods may then, based on determining that the deduplicated object does not exist on the second node, (1) direct the additional request, based on the partitioning scheme, to a third node within the plurality of nodes that is responsible for forwarding requests pertaining to an additional partition of the fingerprint space that includes the additional fingerprint, and (2) forward the additional request from the third node to a fourth node identified by the third node as corresponding to the additional fingerprint. In some examples, these systems and methods may then locate the additional deduplicated object on the fourth node and send future requests to the fourth node until a lookup attempt on the fourth node fails.

In some examples, the systems and methods described herein may contribute to building the data structures on the nodes within the plurality of nodes that help to direct lookup attempts to the correct node. For example, these systems and methods may (1) add the deduplicated object to the collection of deduplicated data (e.g., before later requesting a lookup for the deduplicated object), (2) update a fingerprint index on the second node with an association of the fingerprint with the deduplicated object, and then (3) update an additional fingerprint index on the first node with an association of the fingerprint with the second node. Using FIG. 4 as an example, one or more of modules 102 may, as a part of node 420, add the deduplicated object to deduplicated data 426 on node 420. One or more of modules 102 may then, as a part of node 420, update layer 450 on node 420 to link fingerprint "7" with the deduplicated object in deduplicated data 426. One or more of the modules 102 may then, as a part of node 420, identify node 430 as maintaining a partition of the fingerprint space in layer 440 including fingerprint "7." One or more of the modules 102 may then therefore send a message to node 430 to associate fingerprint "7" with node 420. One or more of modules 102 may then, as a part of node 430, update layer 440 on node 430 to associate fingerprint "7" with node 420.

By maintaining a fingerprint index for deduplicated data stored on each node, the systems and methods described herein may efficiently ensure consistency between each fingerprint index and the data it represents. For example, since layer 450 on node 420 may include each fingerprint corresponding to data in deduplicated data 426 and no other fingerprints, layer 450 on node 420 may easily be kept consistent with deduplicated data 426, since such consistency may not require internode communication.

In some examples, the systems and methods described herein may scale a deduplicated data system using the plurality of nodes by adding nodes to the plurality of nodes. For example, these systems and methods may identify a new node added to the plurality of nodes. These systems and methods may then update the partitioning scheme to reassign at least one partition of the fingerprint space to the new node. For example, 7000 partitions may be distributed among 2000 nodes. 1000 nodes may handle three partitions and 1000 nodes may handle four partitions. When a new node is added, 3 of the nodes that handle four partitions may transfer responsibility of one partition each to the new node (e.g., along with associated data linking fingerprints within the partitions with corresponding nodes). The system may then include 1004 nodes handling three partitions and 997 nodes handling four partitions. Because this process may require only minimal internode communication, it may be appreciated that these systems and methods may efficiently scale a deduplicated data system without significantly disrupting performance.

As explained above, by performing lookups in two stages, the systems and methods described herein may distribute the burden of lookups across a cluster of nodes without requiring each node to have a full view of all fingerprints, thereby potentially increasing the speed, reliability, and/or scalability of a cluster-hosted deduplicated data system. Furthermore, according to some examples, by arranging data in the deduplicated data system such that any given client may tend to require many lookups from a single node, the systems and methods described herein may increase the speed and/or reliability of the deduplicated data system by performing subsequent lookups directly on a node at the second stage without returning to the first-stage lookup until necessary.

Figure 5:
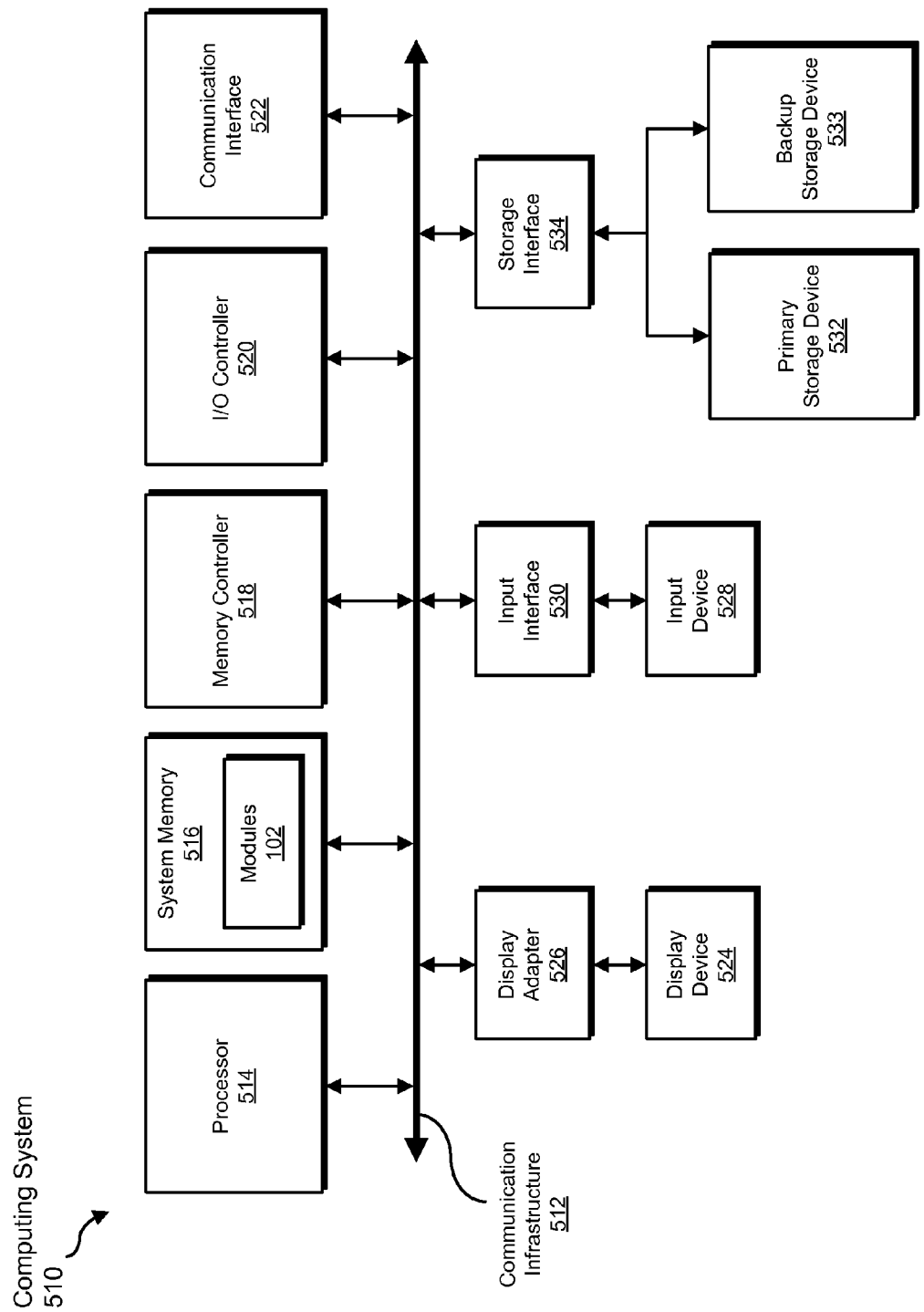
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, directing, forwarding, determining, adding, and/or updating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
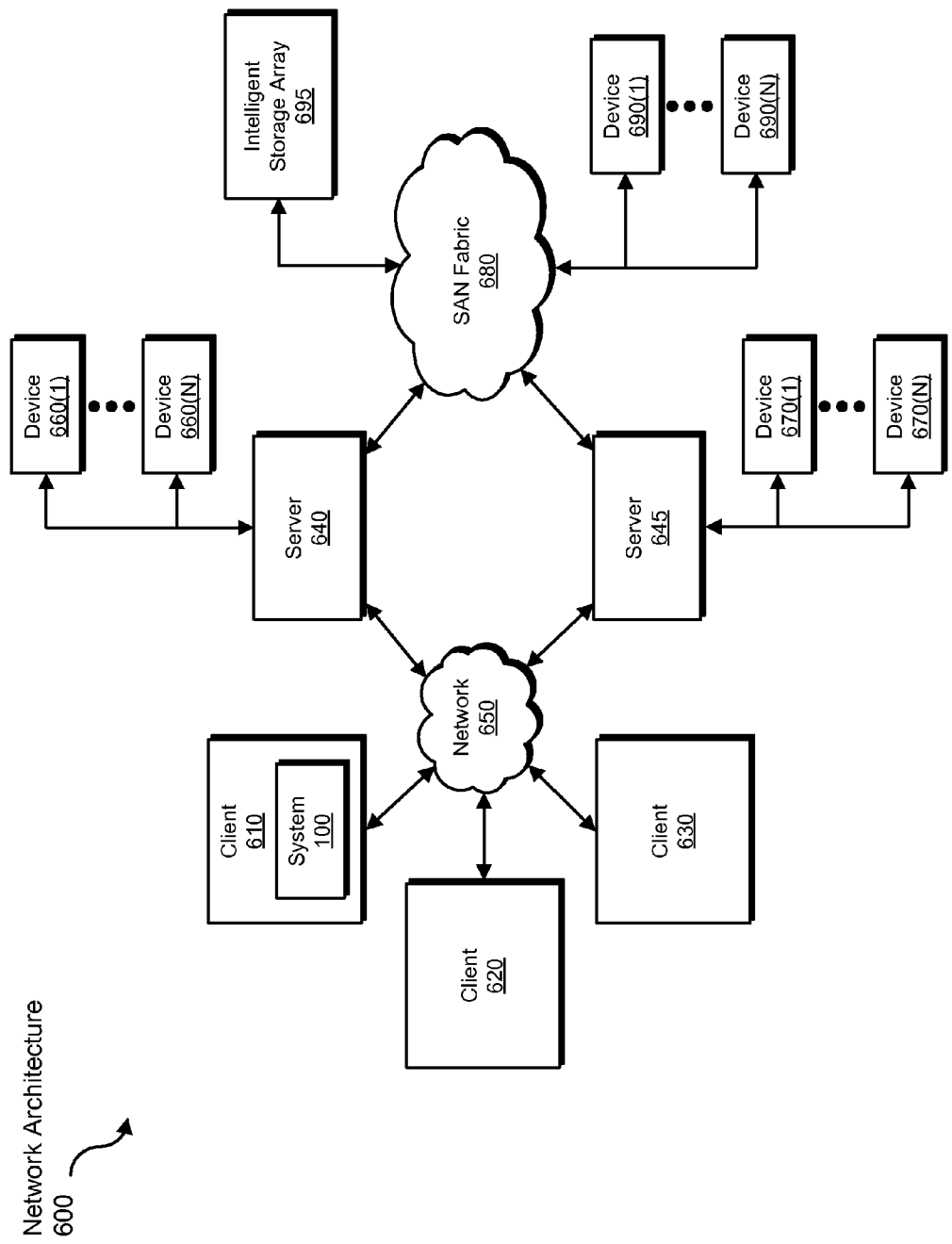
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, directing, forwarding, determining, adding, and/or updating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing lookups on distributed deduplicated data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a plurality of nodes into a system for efficient deduplicated data lookups.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing lookups on distributed deduplicated data systems, at least a portion of the method being performed by a computing device comprising at least one processor, the method comprising:
    identifying a collection of deduplicated data stored within a plurality of nodes;
    identifying a request to locate a deduplicated object of the collection within the plurality of nodes;
    identifying a fingerprint of the deduplicated object, the fingerprint being generated using an algorithm that maps deduplicated objects onto a fingerprint space, the fingerprint space comprising a set of possible fingerprint values generated using the algorithm;
    directing the request, based on a partitioning scheme that divides the fingerprint space among the plurality of nodes, to a first node within the plurality of nodes that is responsible for forwarding requests pertaining to a partition of the fingerprint space that comprises the fingerprint;
    forwarding the request from the first node to a second node identified by the first node as corresponding to the fingerprint, wherein the first node identifies the second node as corresponding to the fingerprint by using data stored by the first node that associates fingerprints that fall within the partition of the fingerprint space with nodes in which deduplicated data objects corresponding to the fingerprints that fall within the partition of the fingerprint space are expected to be found;
    locating the deduplicated data object of the collection as being stored at the second node;
    in response to locating the deduplicated data object at the second node, at least one of:
        retrieving the deduplicated data object from the second node;
        replacing an instance of data with a reference to the deduplicated data object stored at the second node.

2. The computer-implemented method of claim 1, wherein identifying the collection of deduplicated data comprises identifying a collection of deduplicated data originating from a plurality of clients.

3. The computer-implemented method of claim 2, wherein:
    identifying the request comprises identifying a request from a client within the plurality of clients;
    at least one home node within the plurality of nodes is designated for storing unique objects added to the collection of deduplicated data from the client.

4. The computer-implemented method of claim 1, further comprising:
    in response to the request, identifying the deduplicated object on the second node;
    identifying a subsequent request to locate an additional deduplicated object of the collection within the plurality of nodes;
    forwarding the subsequent request directly to the second node based on having identified the deduplicated object on the second node.

5. The computer-implemented method of claim 1, further comprising:
    in response to an additional request, determining that the deduplicated object does not exist on the second node;
    identifying a subsequent request to locate an additional deduplicated object of the collection within the plurality of nodes;
    identifying an additional fingerprint of the additional deduplicated object, the additional fingerprint being generated using the algorithm that maps deduplicated objects onto the fingerprint space;
    based on determining that the deduplicated object does not exist on the second node:
        directing the subsequent request, based on the partitioning scheme, to a third node within the plurality of nodes that is responsible for forwarding requests pertaining to an additional partition of the fingerprint space that comprises the additional fingerprint;
        forwarding the subsequent request from the third node to a fourth node identified by the third node as corresponding to the additional fingerprint.

6. The computer-implemented method of claim 1, further comprising, in response to the request, identifying the deduplicated object on the second node.

7. The computer-implemented method of claim 1, further comprising:
    adding the deduplicated object to the collection of deduplicated data;
    updating a fingerprint index on the second node with an association of the fingerprint with the deduplicated object;
    updating an additional fingerprint index on the first node with an association of the fingerprint with the second node.

8. The computer-implemented method of claim 1, further comprising:
    identifying a new node added to the plurality of nodes;
    updating the partitioning scheme to reassign at least one partition of the fingerprint space to the new node.

9. A system for performing lookups on distributed deduplicated data systems, the system comprising:
    an identification module programmed to:
        identify a collection of deduplicated data stored within a plurality of nodes;
        identify a request to locate a deduplicated object of the collection within the plurality of nodes;
        identify a fingerprint of the deduplicated object, the fingerprint being generated using an algorithm that maps deduplicated objects onto a fingerprint space, the fingerprint space comprising a set of possible fingerprint values generated using the algorithm;
    a direction module programmed to direct the request, based on a partitioning scheme that divides the fingerprint space among the plurality of nodes, to a first node within the plurality of nodes that is responsible for forwarding requests pertaining to a partition of the fingerprint space that comprises the fingerprint;
    a forwarding module programmed to:
        forward the request from the first node to a second node identified by the first node as corresponding to the fingerprint, wherein the first node identifies the second node as corresponding to the fingerprint by using data stored by the first node that associates fingerprints that fall within the partition of the fingerprint space with nodes in which deduplicated data objects corresponding to the fingerprints that fall within the partition of the fingerprint space are expected to be found;
        locate the deduplicated data object of the collection as being stored at the second node;
        in response to locating the deduplicated data object at the second node, at least one of:
            retrieve the deduplicated data object from the second node;

replace an instance of data with a reference to the deduplicated data object stored at the second node;
at least one processor configured to execute the identification module, the direction module, and the forwarding module.

10. The system of claim 9, wherein the identification module is programmed to identify the collection of deduplicated data by identifying a collection of deduplicated data originating from a plurality of clients.

11. The system of claim 10, wherein:
the identification module is programmed to identify the request by identifying a request from a client within the plurality of clients;
at least one home node within the plurality of nodes is designated for storing unique objects added to the collection of deduplicated data from the client.

12. The system of claim 9, wherein:
the forwarding module is further programmed to, in response to the request, identify the deduplicated object on the second node;
the identification module is further programmed to identify a subsequent request to locate an additional deduplicated object of the collection within the plurality of nodes;
the forwarding module is further programmed to forward the subsequent request directly to the second node based on having identified the deduplicated object on the second node.

13. The system of claim 9, wherein:
the forwarding module is further programmed to, in response to an additional request, determine that the deduplicated object does not exist on the second node;
the identification module is further programmed to:
identify a subsequent request to locate an additional deduplicated object of the collection within the plurality of nodes;
identify an additional fingerprint of the additional deduplicated object, the additional fingerprint being generated using the algorithm that maps deduplicated objects onto the fingerprint space;
the directing module is further programmed to, based on determining that the deduplicated object does not exist on the second node, direct the subsequent request, based on the partitioning scheme, to a third node within the plurality of nodes that is responsible for forwarding requests pertaining to an additional partition of the fingerprint space that comprises the additional fingerprint;
the forwarding module is further programmed to forward the subsequent request from the third node to a fourth node identified by the third node as corresponding to the additional fingerprint.

14. The system of claim 9, wherein the forwarding module is further programmed to, in response to the request, identify the deduplicated object on the second node.

15. The system of claim 9, further comprising an addition module programmed to:
add the deduplicated object to the collection of deduplicated data;
update a fingerprint index on the second node with an association of the fingerprint with the deduplicated object;
update an additional fingerprint index on the first node with an association of the fingerprint with the second node.

16. The system of claim 9, further comprising a rebalancing module programmed to:
identify a new node added to the plurality of nodes;
update the partitioning scheme to reassign at least one partition of the fingerprint space to the new node.

17. A non-transitory computer-readable-storage medium comprising one or more computer-executable instructions that, when executed by at least one processor of a computing device, cause the computing device to:
identify a collection of deduplicated data stored within a plurality of nodes;
identify a request to locate a deduplicated object of the collection within the plurality of nodes;
identify a fingerprint of the deduplicated object, the fingerprint being generated using an algorithm that maps deduplicated objects onto a fingerprint space, the fingerprint space comprising a set of possible fingerprint values generated using the algorithm;
direct the request, based on a partitioning scheme that divides the fingerprint space among the plurality of nodes, to a first node within the plurality of nodes that is responsible for forwarding requests pertaining to a partition of the fingerprint space that comprises the fingerprint;
forward the request from the first node to a second node identified by the first node as corresponding to the fingerprint, wherein the first node identifies the second node as corresponding to the fingerprint by using data stored by the first node that associates fingerprints that fall within the partition of the fingerprint space with nodes in which deduplicated data objects corresponding to the fingerprints that fall within the partition of the fingerprint space are expected to be found;
locate the deduplicated data object of the collection as being stored at the second node;
in response to locating the deduplicated data object at the second node, at least one of:
retrieve the deduplicated data object from the second node;
replace an instance of data with a reference to the deduplicated data object stored at the second node.

18. The computer-readable-storage medium of claim 17, wherein the one or more computer-executable instructions cause the computing device to identify the collection of deduplicated data by causing the computing device to identify a collection of deduplicated data originating from a plurality of clients.

19. The computer-readable-storage medium of claim 18, wherein:
the one or more computer-executable instructions cause the computing device to identify the request by causing the computing device to identify a request from a client within the plurality of clients;
at least one home node within the plurality of nodes is designated for storing unique objects added to the collection of deduplicated data from the client.

* * * * *